(12) United States Patent
Niikawa et al.

(10) Patent No.: US 6,734,876 B2
(45) Date of Patent: May 11, 2004

(54) IMAGE DISPLAY APPARATUS

(75) Inventors: Masahito Niikawa, Sakai (JP); Kenji Nakamura, Takatsuki (JP)

(73) Assignee: Minolta Co. ,Ltd., Osaka (JP)

( * ) Notice: Subject to any disclaimer, the term of this patent is extended or adjusted under 35 U.S.C. 154(b) by 0 days.

(21) Appl. No.: 09/201,465

(22) Filed: Nov. 30, 1998

(65) Prior Publication Data

US 2002/0101440 A1 Aug. 1, 2002

(30) Foreign Application Priority Data

| Nov. 28, 1997 | (JP) | ............................................. 9-328024 |
| Dec. 10, 1997 | (JP) | ............................................. 9-340255 |
| Dec. 10, 1997 | (JP) | ............................................. 9-340258 |

(51) Int. Cl.[7] ................................................ G09G 5/02
(52) U.S. Cl. ....................................... 345/698; 345/699
(58) Field of Search .......................... 382/299; 345/439, 345/55, 132, 127, 698, 699, 619, 634

(56) References Cited

U.S. PATENT DOCUMENTS

| 4,833,625 A | * | 5/1989 | Fisher et al. ................. 364/518 |
| 4,947,097 A | | 8/1990 | Tao ............................. 318/696 |
| 5,046,027 A | * | 9/1991 | Taaffe et al. ................. 364/521 |
| 5,440,401 A | * | 8/1995 | Parulski et al. .............. 358/342 |
| 5,633,726 A | * | 5/1997 | Timmermans ................ 386/70 |
| 5,642,171 A | * | 6/1997 | Baumgartner et al. ....... 348/515 |
| 5,652,630 A | * | 7/1997 | Bertram et al. .............. 348/734 |
| 5,678,451 A | | 10/1997 | Vergneau et al. ............ 74/10 R |
| 5,724,070 A | * | 3/1998 | Denninghoff et al. ........ 345/202 |
| 6,002,446 A | * | 12/1999 | Eglit ........................... 348/581 |
| 6,011,546 A | * | 1/2000 | Bertram ....................... 345/327 |
| 6,016,139 A | * | 1/2000 | Terasawa et al. ............ 345/169 |

FOREIGN PATENT DOCUMENTS

| JP | 5-89176 | 4/1993 |
| JP | 5-257979 | 10/1993 |
| JP | 5-282375 | 10/1993 |
| JP | 6-195388 | 7/1994 |
| JP | 8-77203 | 3/1996 |

OTHER PUBLICATIONS

"Image Analysis Handbook", Tokyo University Publishing, First Edition, Jan. 17, 1991, pp. 462–467.

* cited by examiner

Primary Examiner—Vijay Shankar
(74) Attorney, Agent, or Firm—Sidley Austin Brown & Wood LLP

(57) ABSTRACT

An image display apparatus has a display for displaying image data and a controller having a display mode in which, from an image recording medium on which a plurality of image files each containing low-resolution image data and high-resolution image data are recorded, the low-resolution image data of each of the image files is displayed successively on said display. Thus, particular images can be extracted quickly and reliably from a number of image files.

20 Claims, 15 Drawing Sheets

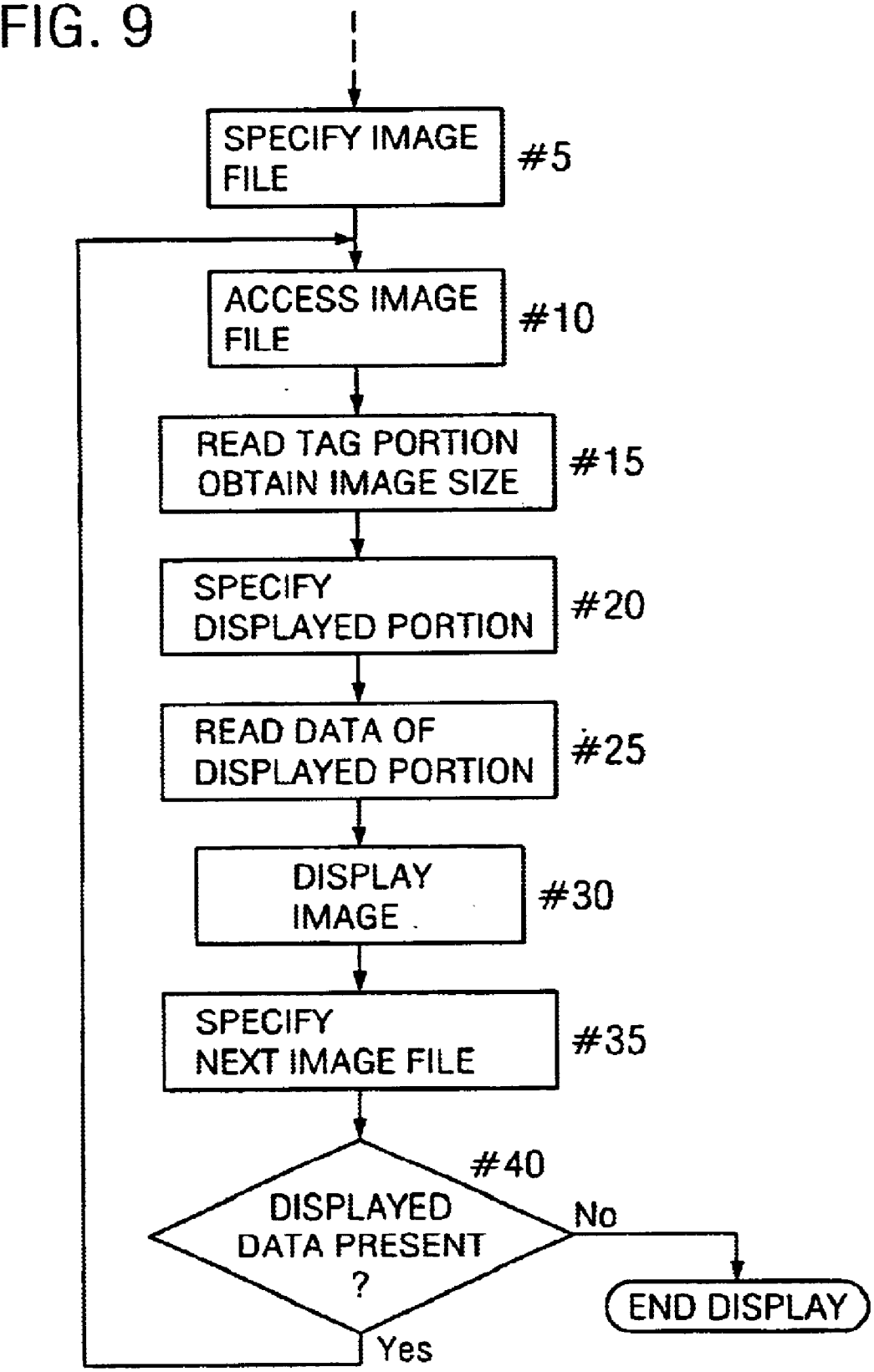

IMAGE DISPLAY APPARATUS

This application is based on applications Nos. H9-328024, H9-340255, and H9-340258 filed in Japan, the contents of which are hereby incorporated by reference.

BACKGROUND OF THE INVENTION

1. Field of the Invention

The present invention relates to an image display apparatus for displaying image data stored in image recording media.

2. Description of the Prior Art

In the image display apparatus, methods of extracting a desired image file from an image recording medium in which a plurality of image files are stored include a method in which key information is input to extract a desired image file. In this method, it is necessary for each image file to be associated with key information (code information).

Extraction of a desired image can be performed not only by inputting key information but also by using a browsing function. The browsing function is a function of displaying images frame by frame on a display screen. That is, by stopping or discontinuing browsing when a desired image is displayed, a desired image file can be extracted by the operator's visual judgment.

However, in the method to input key information to extract a desired image file, it is necessary to perform key information systematization and key information assignment, which requires great labor. Particularly, for image data taken by digital cameras, it is necessary to assign (input) key information at the time of photographing. This work is generally complicated, and the user misses the right moment to take a picture if his or her attention is directed to key information assignment.

In the method to use the browsing function to extract a desired image, when a desired image is extracted from several tens of frames of image data, this method is practical and the desired image is surely extracted. However, when the number of frames of image data from which a desired image is extracted is large, this method is not practical because browsing takes a long time. Particularly, in the case of a digital camera, the user tends to take a large number of pictures compared to the case of a silver halide film camera because development, printing and enlargement (DPE) are unnecessary. Therefore, the number of image data tends to be large.

SUMMARY OF THE INVENTION

In view of the above-described problem, an object of the present invention is to provide an image display apparatus in which it is unnecessary to assign key information and a desired image can be surely extracted in a short time even when the number of image data is great.

To achieve the above object, according to one aspect of the present invention, an image display apparatus is provided with: a display for displaying image data; and a controller having a first display mode in which, from an image recording medium on which a plurality of image files each containing low-resolution image data and high-resolution image data are recorded, the low-resolution image data of each of the image files is displayed successively on the display.

According to another aspect of the present invention, a method for displaying image data from an image recording medium on which a plurality of image files each containing low-resolution image data and high-resolution image data are recorded, includes the step of: successively displaying the low-resolution image data of each of the image files.

According to another aspect of the present invention, an image display apparatus is provided with: a display for displaying image data; and a controller having a display mode in which, from an image recording medium on which a plurality of image files each containing image data are recorded, only a predetermined portion of the image data of each of the image files is displayed on the display.

According to still another aspect of the present invention, an image display apparatus is provided with: a display for displaying image data; and a controller having a display mode in which, from an image recording medium on which a plurality of image files each containing image data are recorded, the image data of each of the image files is displayed on the display after being thinned down.

According to still another aspect of the present invention, an image display apparatus is provided with: a display for displaying image data; and a controller having a first display mode in which, from an image recording medium on which a plurality of image files each containing image data and tag information are recorded, the image data of each of particular ones of the image files that are selected according to the tag information is displayed successively on the display.

According to still another aspect of the present invention, an image display apparatus is provided with: a display for displaying image data; a retainer for retaining the image data; and a controller that operates such that image data of a number n of image files recorded in compressed form on an image recording medium is expanded so as to be retained in the retainer, and that the image data retained in the retainer is then displayed successively on the display.

DESCRIPTION OF THE DRAWINGS

FIG. 9 is a control flowchart of display processing in a second embodiment;

DESCRIPTION OF THE PREFERRED EMBODIMENTS

<First Embodiment>

Figure 1:
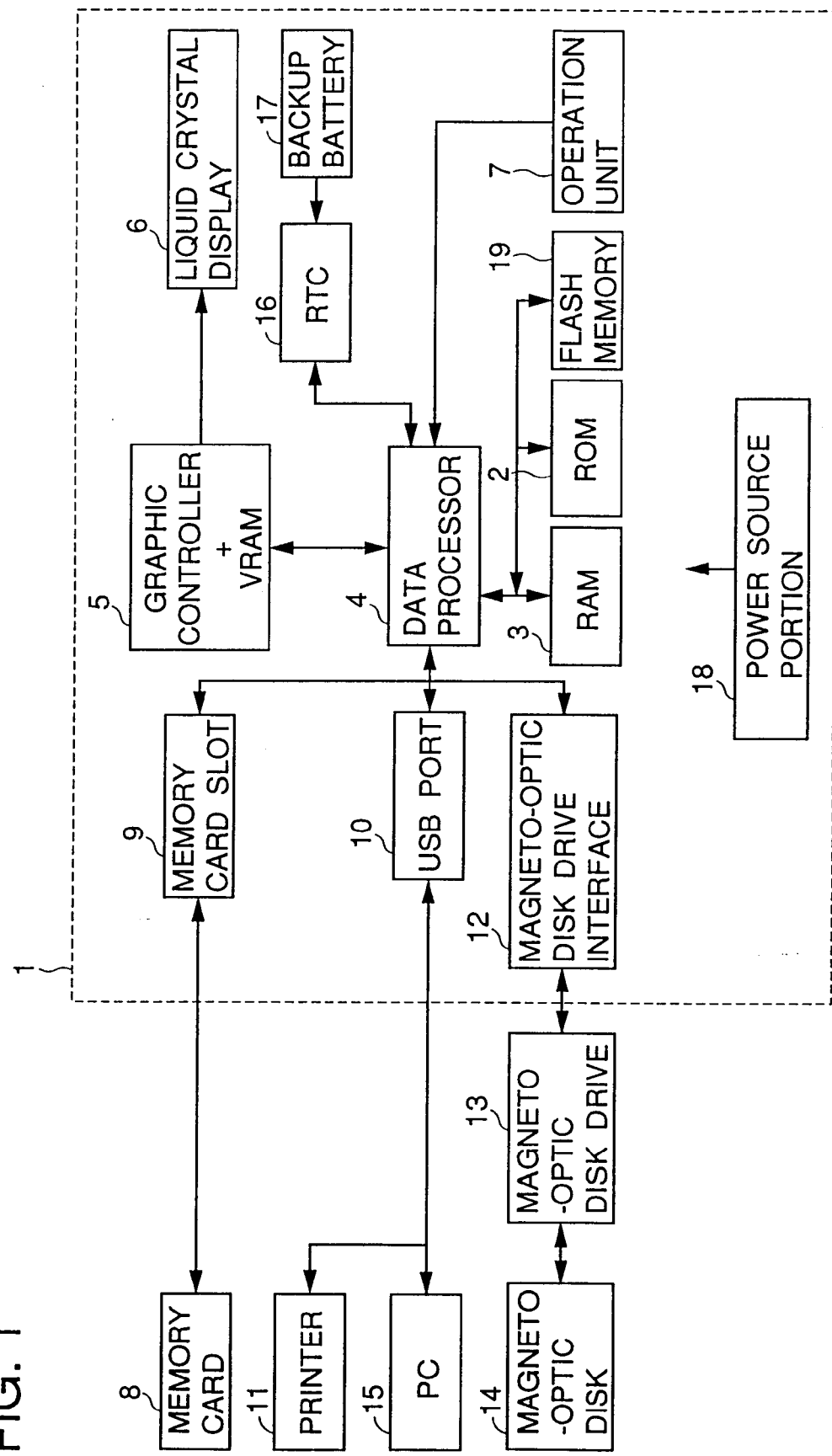
FIG. 1 is a block diagram of an image display system including an image display apparatus according to a first embodiment.

FIG. 1 is a block diagram of an image display system including an image display apparatus according to a first embodiment of the present invention. An image display apparatus body 1 is provided with a memory card slot 9 for inserting a memory card 8 in which images taken by a digital camera are stored, and a USB port 10 for connecting a printer 11 and a personal computer (PC) 15.

The image display apparatus body 1 is further provided with a magneto-optic disk interface 12 through which a magneto-optic disk drive 13 for driving a magneto-optic disk 14 can be directly connected to the image display apparatus body 1. Images stored in the memory card 8 and in the magneto-optic disk 14 are displayed on a display portion 6 comprising liquid crystal by operating switches of an operation portion 7 of the body 1. Operation menus for performing various operations are also displayed on the display portion 6.

To control the image display apparatus body 1, a central processing unit (CPU) in a data processor 4 reads out a program stored in a read only memory (ROM) 2, and based on the program, the memory card slot 9, the USB port 10, the magneto-optic disk interface 12, a graphic controller and a video random access memory (VRAM) 5 are controlled. The CPU in the data processor 4 is a controller of the image display apparatus body 1.

The date and time of data processing can be stored in the magneto-optic disk 14 and in the memory card 8 since a real-time clock (RTC) 16 driven by a backup battery 17 is connected to the data processor 4. In a flash memory 19, the result of transfer to the magneto-optic disk 14 is stored.

Figure 2:
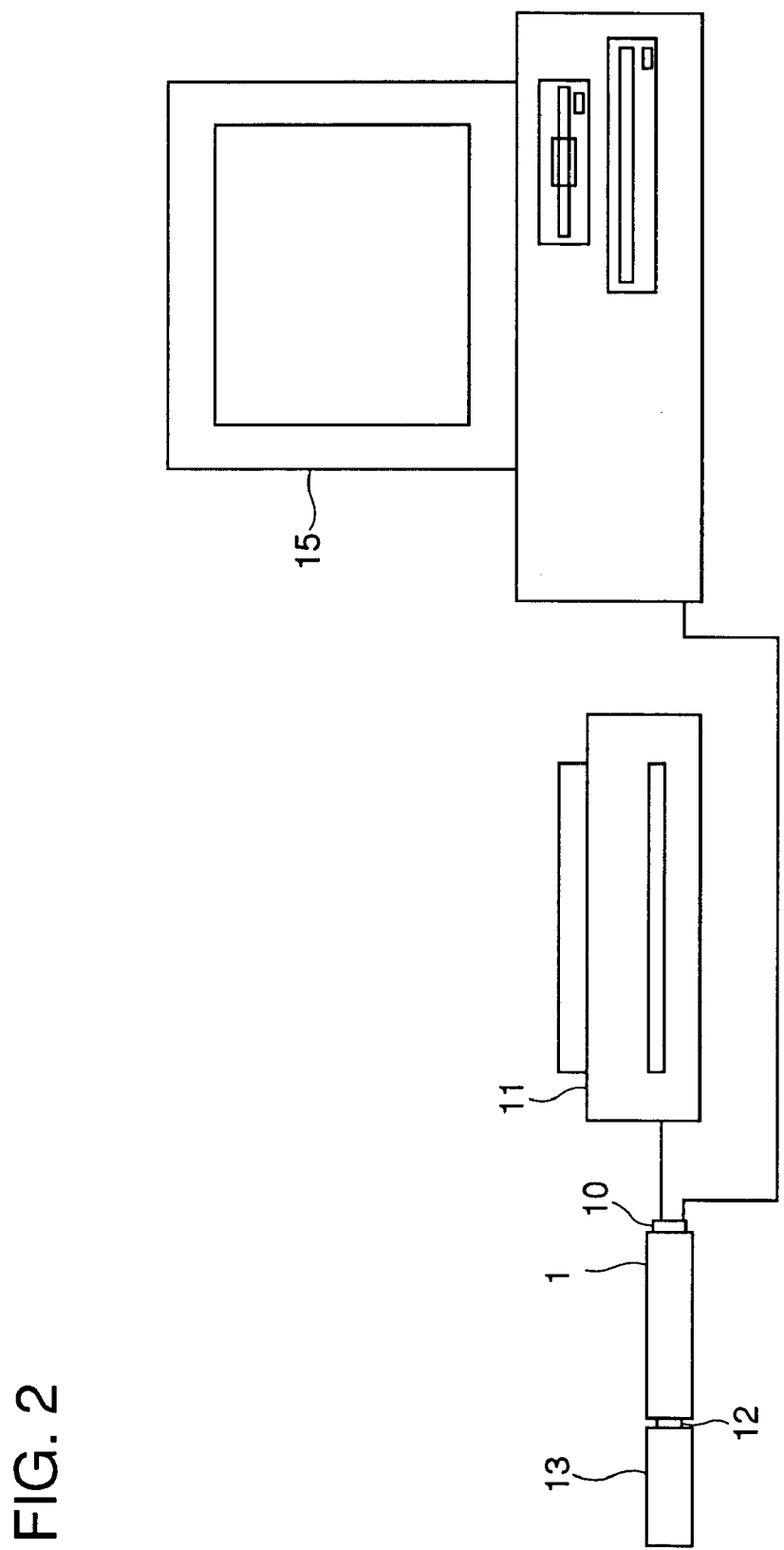
FIG. 2 is an exterior view of the image display system of FIG. 1.

To the image display apparatus body 1, power can be supplied by a non-illustrated AC adapter as well as by the battery in a power source portion 18. FIG. 2 is an exterior view of the image display system shown in FIG. 1.

Figure 3:
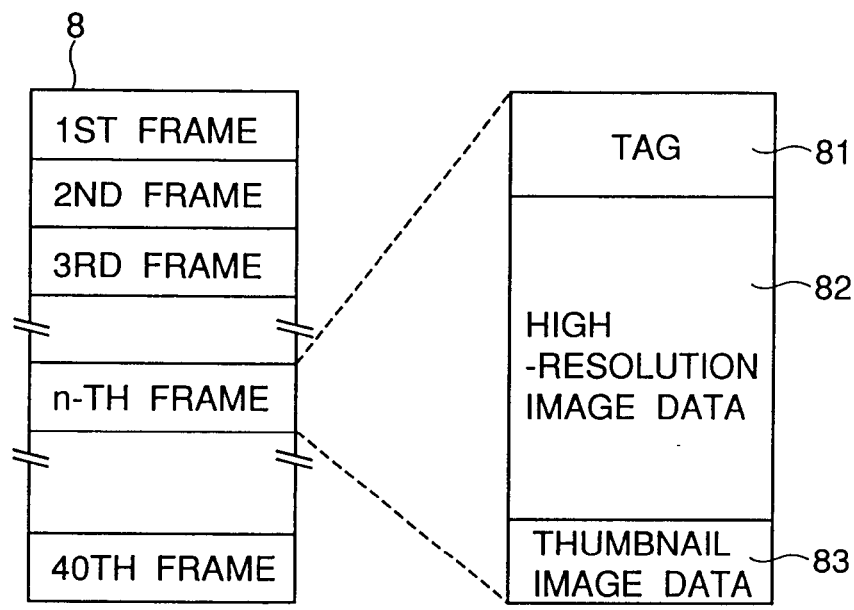
FIG. 3 is a schematic view of the data arrangement in a memory card.

Subsequently, the data arrangement in the memory card 8 will be described. FIG. 3 schematically shows the data arrangement in the memory card 8. In the memory card 8, forty frames of images taken by a digital camera are stored. In each frame, the following are stored: a tag 81; high-resolution image data (640×480 pixels) 82 compressed in JPEG format; and low-resolution image data (80×60 pixels) 83 for thumbnail display.

Each of the frames can be handled as an image file of, for example, EXIF format. In the tag 81, photographing date data, photographing time data and data on whether the flash was used or not at the time of photographing are stored.

Figure 4:
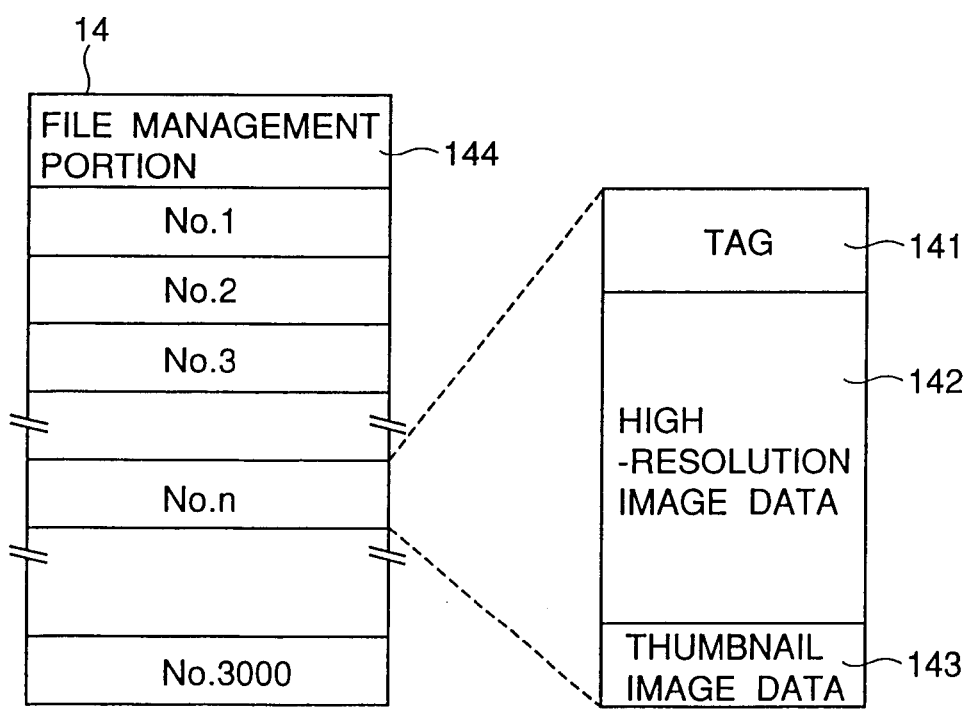
FIG. 4 is a schematic view of the data arrangement in a magneto-optic disk.

Subsequently, the data arrangement in the magneto-optic disk 14 will be described. Image data in the memory card 8 can be transferred to the magneto-optic disk 14 for storage. FIG. 4 schematically shows the data arrangement in the magneto-optic disk 14. Image files are numbered 1, 2, 3, ..., n, ... 3000 in the order of storage. In each file, high-resolution image data 142, low-resolution image data 143 for thumbnail display and tag information 141 are stored like in the case of the memory card 8.

A file management portion 144 is provided for managing image files. In the file management portion 144, the general directory structure, the file numbers, the file names and a table for associating directories are stored.

Figure 5:
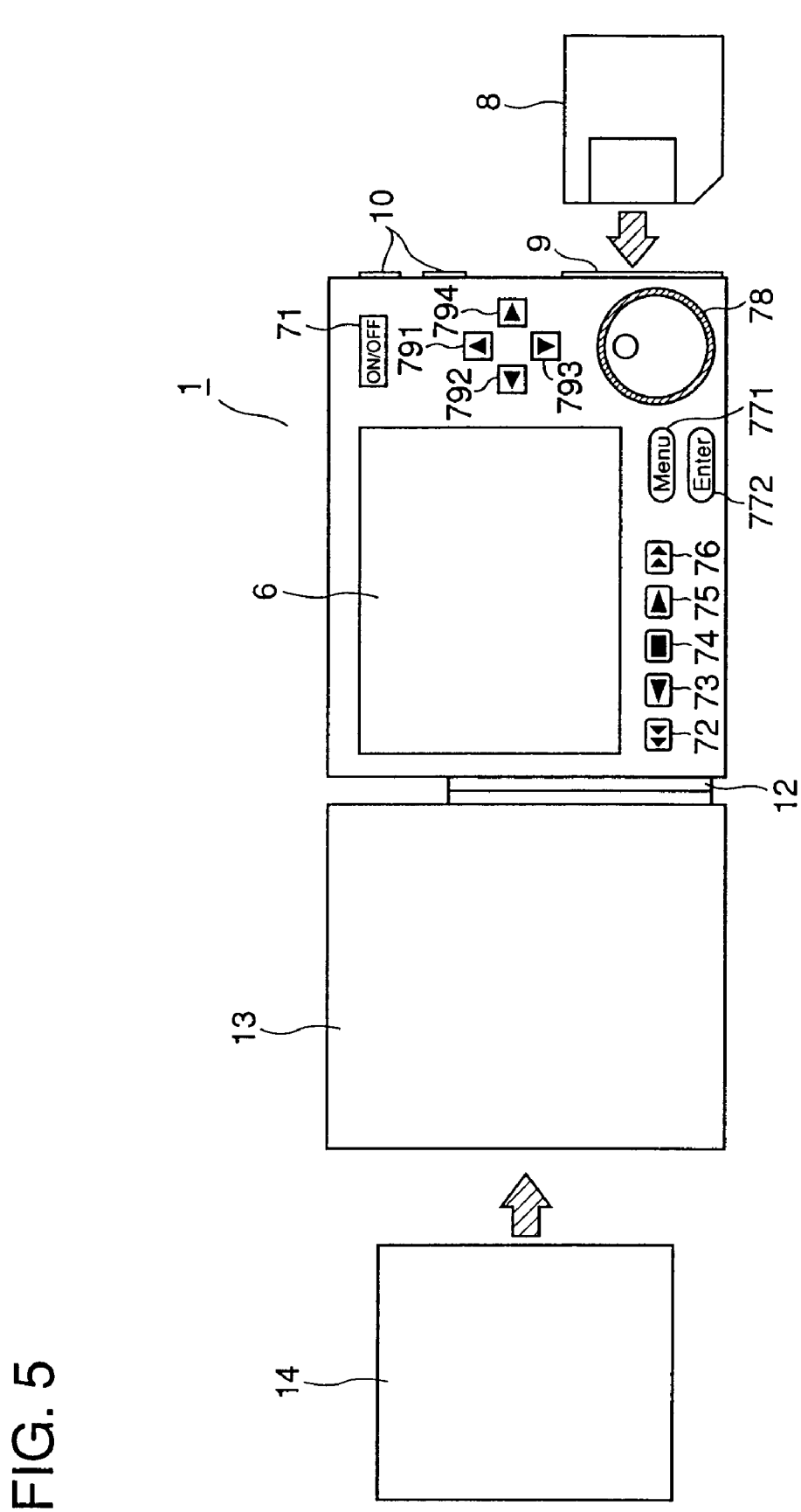
FIG. 5 is a front view of the image display apparatus.

FIG. 5 is a front view of the image display apparatus 1 to which the magneto-optical disk drive 13 is attached. A power button 71, arrow keys 791, 792, 793 and 794, a menu key 771, an enter key 772, a fast reverse key 72, a reverse key 73, a stop key 74, a forward key 75, a fast forward key 76, and a rotary operation member 78 constitute the operation portion 7 of the body 1.

Figure 6:
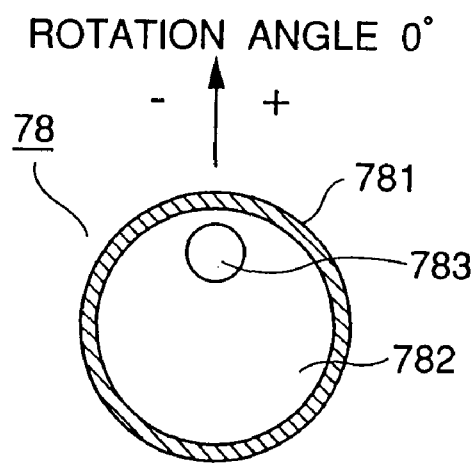
FIG. 6 is a detailed front view of a rotary operation member.

FIG. 6 shows a detailed structure of the rotary operation member 78. The rotary operation member 78 comprises an outer rotary ring 781 and an inner rotary member 782. The outer rotary ring 781 which is rotatable within a range of ±90° has functions equivalent to those of the following keys according to the rotation angle:

+10° to +30°: the forward key 75
+50° to +70°: the fast forward key 76
−10° to −30°: the reverse key 73
−50° to −70°: the fast reverse key 72
The other angles: the stop key 74

The outer rotary ring 781 is pushed by a spring and situated at the position of 0° unless held rotated by fingers. The inner rotary member 782 has a concave 783 for putting a finger thereon, and is provided with a click stop and a contact every 30°. When the inner rotary member 782 is rotated by one unit in the positive direction when the image of a frame is displayed, the image of the next frame is displayed. When the inner rotary member 782 is rotated by one unit in the negative direction, the image of the previous frame is displayed.

Subsequently, the display transition on the display portion 6 of the apparatus 1 will be described with focus on the display in a (browsing) mode for displaying images frame by frame. The magneto-optic disk drive 13 is attached to the body 1 and the power button 71 of the body 1 is turned on. Then, a program stored in the ROM 2 of the body 1 connected to the data processor 4 is read out. After initialization of the RAM 3, etc. is performed in accordance with the processing procedure in the program, the operation portion 7, the memory card slot 9, the USB port 10 and the magneto-optic disk interface 12 become usable.

Figure 7:
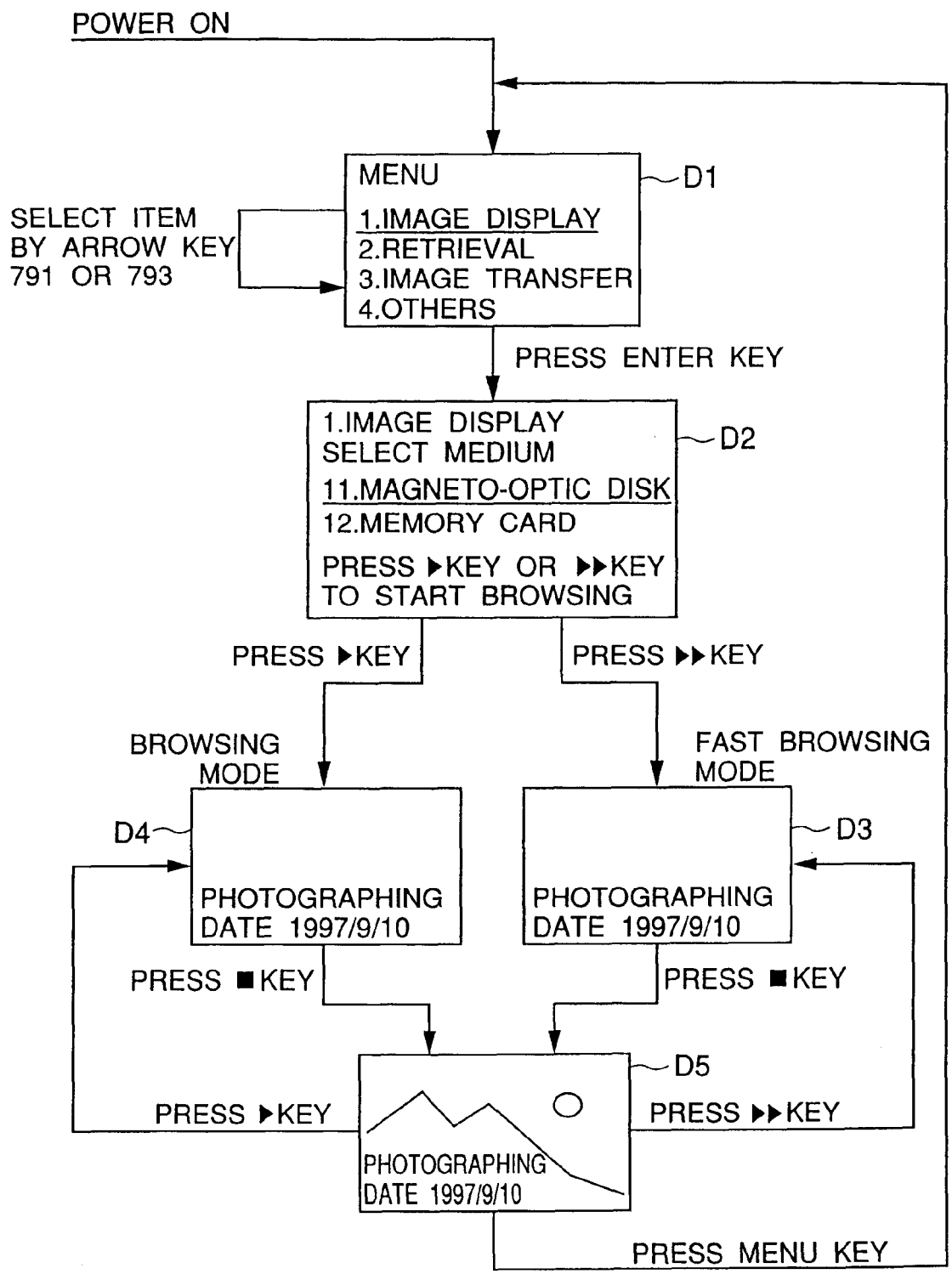
FIG. 7 is a flowchart showing a manner of operation display transition in the first embodiment.

Then, the graphic controller and the VRAM 5 under the control of the data processor 4 are controlled, and an initial display appears on the display portion 6. FIG. 7 is a flowchart showing a manner of operation display transition. In an initial display D1, by pressing the arrow key 791 or 793, the item to be selected can be changed in the order shown. To perform retrieval by browsing, the user selects "1. IMAGE DISPLAY" from among the menu items of the display D1. When the enter key 772 is pressed under this condition, a media selection display D2 appears on the display screen.

In the display D2, the attached one of the magneto-optic disk 14 and the memory card 8 is selected. The device not attached may be made unselectable or the manner of display may be changed. For example, the device not attached may be displayed in a pale color. While in this embodiment, the magneto-optic disk is selected when both are attached, the memory card may be selected. The user can change the device to be selected by pressing the arrow key 791 or 793. In this description, the initially selected "11. MAGNETO-OPTIC DISK" is selected.

When the forward key 75 is pressed under this condition, the browsing mode is established, and of the files in the magneto-optic disk 14, high-resolution image data are displayed frame by frame in the order of photographing (display D4). When the stop key 74 is pressed in the browsing mode, the image displayed when the key 74 is pressed is held displayed (display D5). Thus, a desired image can be extracted by the user's visual judgment.

When the fast forward key 76 is pressed in the display D2, a fast browsing mode is established in which of the files in the magneto-optic disk 14, thumbnail image data are displayed frame by frame in the order of photographing (display D3). Since the thumbnail data size is 80×60 pixels and the display area is 640×480 pixels, when displayed, thumbnail images are interpolated and displayed being enlarged, thereby increasing visibility.

When the stop key 74 is pressed in the fast browsing mode, the image displayed when the key 74 is pressed is held displayed (display D5). Thus, a desired image can be extracted by the user's visual judgment. When the menu key 771 is pressed in the display D5, the display D1 appears on the display screen. When the forward key 75 is pressed in the display D5, the browsing mode is established. When the fast forward key 76 is pressed, the fast browsing mode is established.

When the reverse key 73 is pressed instead of the forward key 75 in the displays D2 and D5, a browsing mode of reverse display is established. When the fast reverse key 72 is pressed instead of the fast forward key 76, a fast browsing mode of reverse display is established. The reverse display means that image data of an image file are displayed in a reverse order.

While only the operation portion 7 is used to perform the operations in the above description, the operations can be performed by rotating the outer rotary ring 781 of the rotary operation member 78 by angles having functions equivalent to those of the keys. Moreover, item selection can be performed by rotating the inner rotary portion 782 of the rotary operation member 78. When the inner rotary member 782 is rotated by one unit in the positive direction, the item to be selected shifts to the next item. When the inner rotary member 782 is rotated by one unit in the negative direction, the item to be selected shifts to the previous item.

When the operations in the browsing mode and in the fast browsing mode are performed by use of the rotary operation member 78, since the user keeps his or her fingers rested on the outer rotary ring 781, in stopping the image display when a desired image is displayed, the user's response is faster than when the operations are performed by use of the keys of the operation portion 7.

<Second Embodiment>

The image display apparatus of this embodiment has a similar structure to that of the image display apparatus of the first embodiment and is different only in a part of the image data display method. Therefore, only the different part will be described and no overlapping description will be given. While thumbnail image data are displayed in the fast browsing mode in the first embodiment, some image file formats have no thumbnail image data corresponding to image data. In order that such file formats can be handled, the second embodiment is provided with a head portion display function to display only the head portion of an image file.

Figure 8:
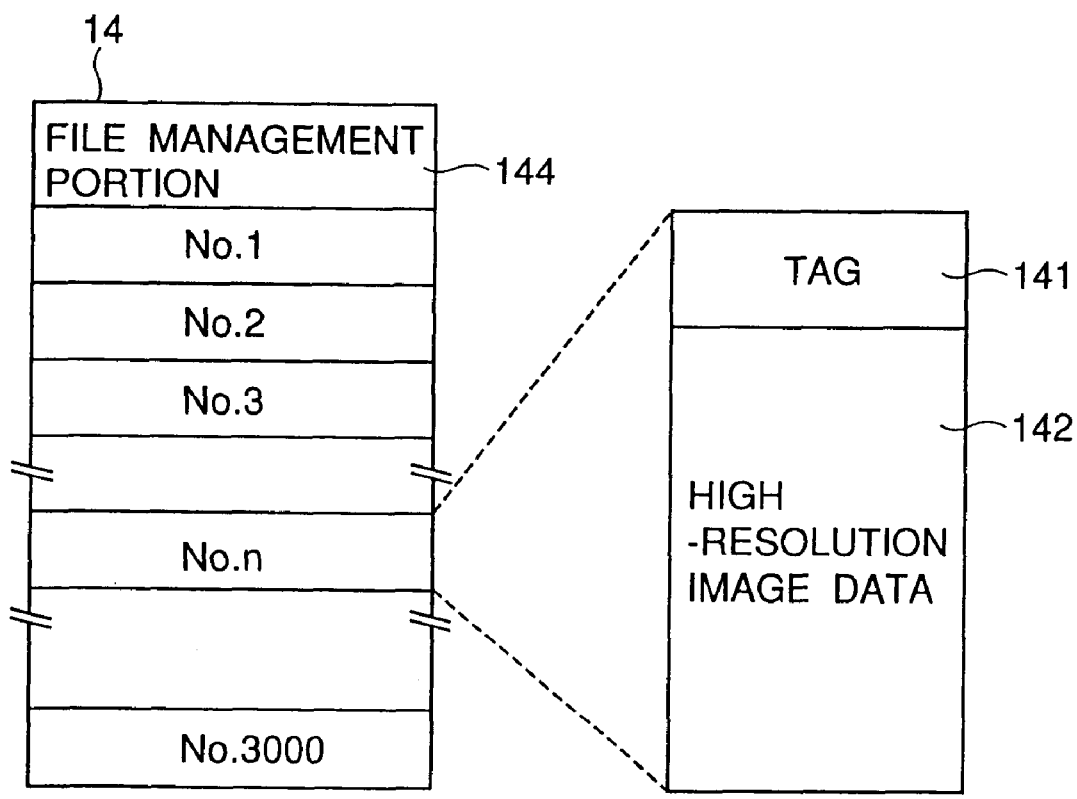
FIG. 8 is a schematic view of the data arrangement in the magneto-optic disk when thumbnail image data are absent.

FIG. 8 schematically shows the data arrangement in the magneto-optic disk 14 when thumbnail image data are absent. It is to be noted that the head portion display function can be used when thumbnail image data are present.

According to the head portion display function, image data can be displayed in a short time because the amount of displayed image data is small. That is, browsing can be performed in a short time. The head portion display function will hereinafter be described.

FIG. 9 is a control flowchart of the data processor 4 based on the head portion display function. When the enter key 772 is pressed in the display D2 of FIG. 7, control based on the head portion display function is started. First, an image file is specified at step #5. When the magneto-optic disk 14 is selected as the medium, an image file is selected by specifying the number of the image file.

While an image file numbered 1 is always selected in this description, image file specification is not limited to this method. The apparatus can be structured so that the user can specify an image file.

Figure 10A:
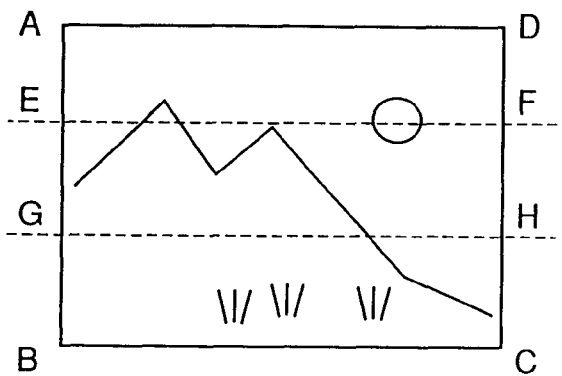
FIG. 10A shows an example of image data in the second embodiment.

Then, at step #10, the specified image file is accessed, and at step #15, the tag portion of the image file is read. At this time, the size of the high-resolution image data is obtained. At step #20, the location of the image head portion is calculated from the obtained size. In this embodiment, an image is divided into three parts in a horizontal direction and the image data of the portion corresponding to the top part of the three parts is regarded as the image data of the head portion. For example, when the image is as shown in FIG. 10A, the image data of the portion corresponding to the rectangle AEFD is the image data of the head portion.

Figure 10B:
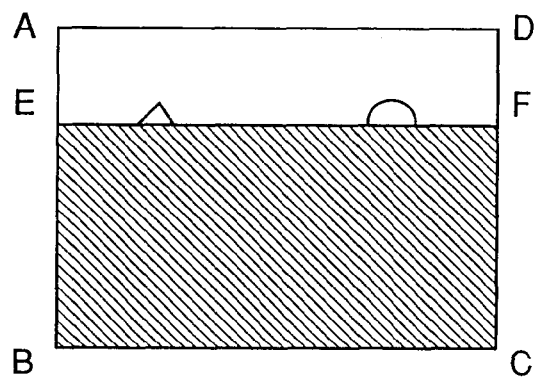
FIG. 10B shows an example of a displayed image in the second embodiment.

At step #25, only the data of the portion corresponding to the rectangle AEFD are read, and at step #30, the data being read are displayed. The image displayed at this time is shown in FIG. 10B. While the image data are being displayed, the process shifts to specification of the next image file at step #35. In the specification of the next image file, when the user rotates the inner rotary member 782 of the rotary operation member 78 by one unit in the positive direction, the image file of the succeeding number is specified, and when the user rotates the inner rotary member 782 by one unit in the negative direction, the image file of the preceding number is specified. Alternatively, the fast browsing mode may be executed like in the first embodiment. In this case, image file specification is automatically performed.

When the image file corresponding to the specified number is absent at step #40, the control based on the head portion display function is ended. Then, when the menu key 771 is pressed, the display is returned to the display D1 of FIG. 7. When the image file is present, the process returns to step #10 to repeat steps #10 to #35. As described above, according to this embodiment, the user can retrieve an image while viewing images successively displayed by operation. Since images are displayed only partly at this time, the time necessary for displaying one frame of image is short, so that image retrieval can be performed in a short time. In the fast browsing mode of the display D3 of FIG. 7, the image data of the head portion may be displayed, or when thumbnail image data are present, image display may be performed in a similar manner to that of the first embodiment.

<Third Embodiment>

The image display apparatus of this embodiment is different from that of the second embodiment only in that a central portion display function to display only the central portion of an image file is provided instead of the head portion display function. Therefore, only the different part will be described and no overlapping description will be given.

The control flowchart of the data processor 4 based on the central portion display function is pursuant to the flowchart shown in FIG. 9. At step #20, the location of the central portion of the image data (in the case of FIG. 10A, the location of the image data of the portion corresponding to the rectangle EGHF) is specified. At step #25, the portion is read. At step #35, the central portion being read is displayed. The other steps are as described previously. In this embodiment, image retrieval can be performed in a short time like in the second embodiment.

<Fourth Embodiment>

The image display apparatus of this embodiment is different from that of the second embodiment only in that a rear end portion display function to display only the rear end portion of an image file is provided instead of the head portion display function. Therefore, only the different part will be described and no overlapping description will be given.

The control flowchart of the data processor 4 based on the rear end portion display function is pursuant to the flowchart shown in FIG. 9. At step #20, the location of the rear end portion of the image data (in the case of FIG. 10A, the location of the image data of the portion corresponding to the rectangle GBCH) is specified. At step #25, the portion is read. At step #30, the rear end portion being read is displayed. The other steps are as described previously. In this embodiment, image retrieval can be performed in a short time like in the second embodiment.

<Fifth Embodiment>

The image display apparatus of this embodiment is different from that of the second embodiment only in that a display function to display image data being thinned out is provided instead of the head portion display function. Therefore, only the different part will be described and no overlapping description will be given.

The control flowchart of the data processor 4 based on the display function of this embodiment is pursuant to the flowchart shown in FIG. 9. At step #20, even-numbered addresses of image data are specified. At step #25, the portion is read. At step #30, the image data being read are displayed. The other steps are as described previously.

Figure 11:
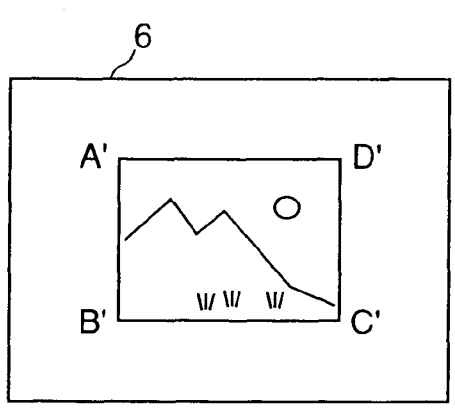
FIG. 11 shows an example of a displayed image in a fifth embodiment.

Methods of displaying image data being read at step #30 include the following two:
1. An offset value is set, and the image data are displayed in a central portion of the display screen of the display portion 6 (display provided by this method is, for example, as shown in FIG. 11).
2. When image data are displayed, pixel interpolation is performed so that the image data are displayed being enlarged. Either of these methods may be employed.

According to the method 2, although it takes time to perform pixel interpolation, since the amount of data being read is smaller, the total time required for display is shorter than in the case where all the images are displayed. As a result, image retrieval can be performed in a short time. Since the number of rotations of the magneto-optic disk 14 is generally small and it takes time to perform a seek, reduction in amount of data being read largely contributes to reduction in display time.

The second, the third or the fourth embodiment and the fifth embodiment may be combined.

<Sixth Embodiment>

The image display apparatus of this embodiment has a similar structure to that of the image display apparatus of the first embodiment and is different only in a part of the control method in browsing. Therefore, only the different part will be described and no overlapping description will be given.

Figure 12:
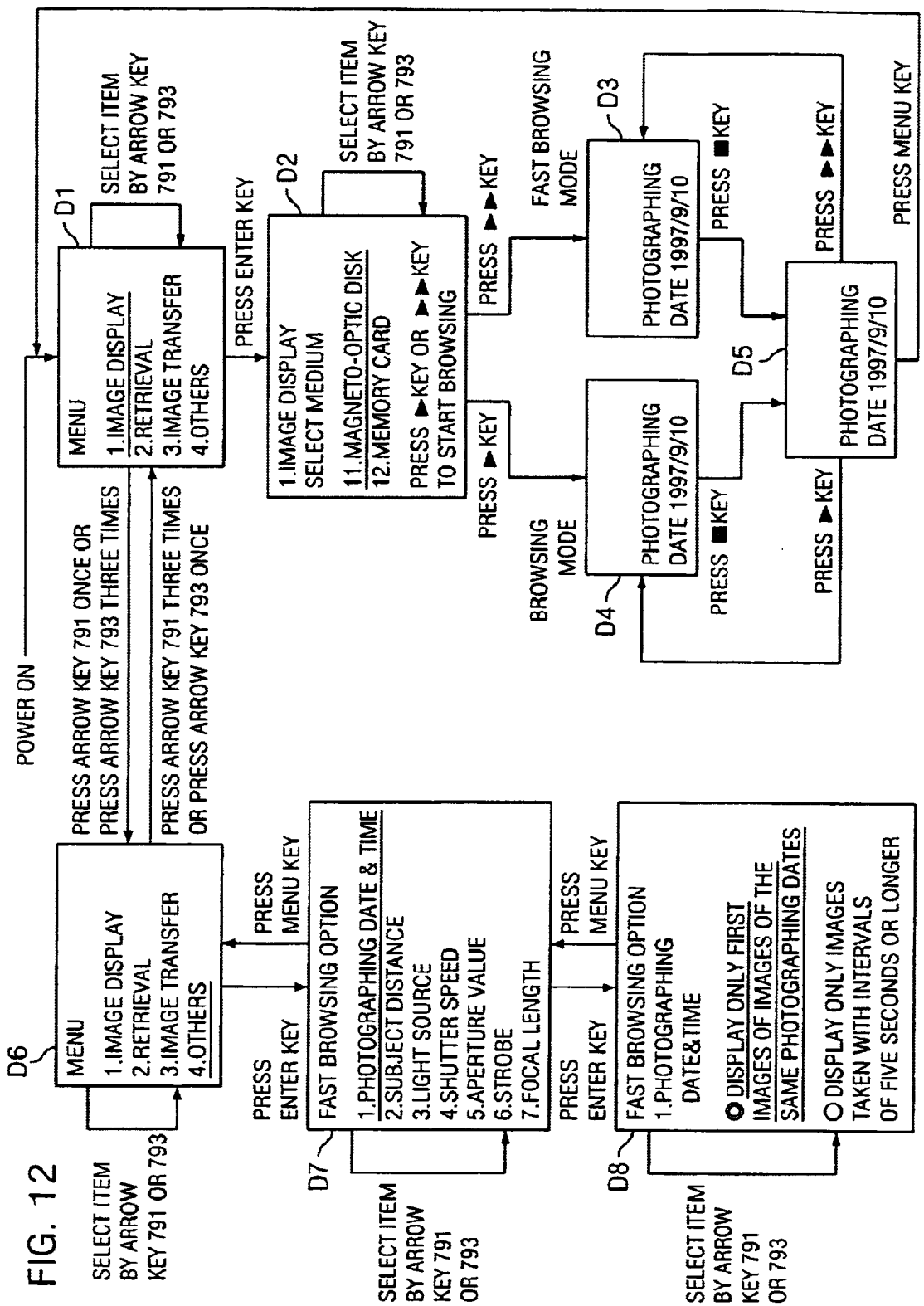
FIG. 12 is a flowchart showing a manner of operation display transition in a sixth embodiment.

FIG. 12 is a flowchart showing a manner of operation display transition in the image display apparatus of this embodiment. While the manner of the display shifting to the displays D2, D3, D4 or D5 after "1. IMAGE DISPLAY" is selected and the enter key 772 is pressed in the initial display D1 is the same as that of the flowchart shown in FIG. 7, the display method in the fast browsing mode (display D3) is different.

In this embodiment, the display method in the fast browsing mode (display D3) can be changed. By default, of the files of the same photographing date, only the file of the earliest photographing time is displayed frame by frame in the order of photographing date. In this case, since the number of displayed image data is reduced, browsing can be performed in a shorter time than in the browsing mode (display D4).

While high-resolution image data are displayed in this description, low-resolution image data for thumbnail display may be displayed. In this case, the time required for data reading is further reduced, so that browsing can be performed faster.

Control of change of the display method (fast browsing option) in the fast browsing mode will be described. To change the fast browsing option, the user operates the arrow key 791 or 793 in the display D1 to select "4. OTHERS", so that the display D6 appears on the display screen. Then, the user presses the enter key 772. When the enter key 772 is pressed, a display D7 appears on the display screen. The user selects a fast browsing option in the display D7 and a subsequently-described display D8. First, the user operates the arrow key 791 or 793 in the display D7 to select data used for deciding images displayed in the fast browsing mode.

By default, "1. PHOTOGRAPHING DATE & TIME" is selected. How the displayed images are decided by use of the data selected in the display D7 is defined in the display D8. When the enter key 772 is pressed with "1. PHOTOGRAPHING DATE & TIME" selected in the display D7, the display D8 appears on the display screen. Here, either "DISPLAY ONLY FIRST IMAGES OF IMAGES OF THE SAME PHOTOGRAPHING DATES" or "DISPLAY ONLY IMAGES TAKEN WITH INTERVALS OF FIVE SECONDS OR LONGER" is selected.

By default, "DISPLAY ONLY FIRST IMAGES OF IMAGES OF THE SAME PHOTOGRAPHING DATES" is selected. Table 1 shows examples of file numbers, photographing dates and photographing times of image files in the magneto-optic disk 14, and whether the image files are displayed or not in the fast browsing mode under a condition where the default fast browsing option is selected. In this case, only the image data of the image files numbered 156, 160 and 161 are displayed.

Figure 13:
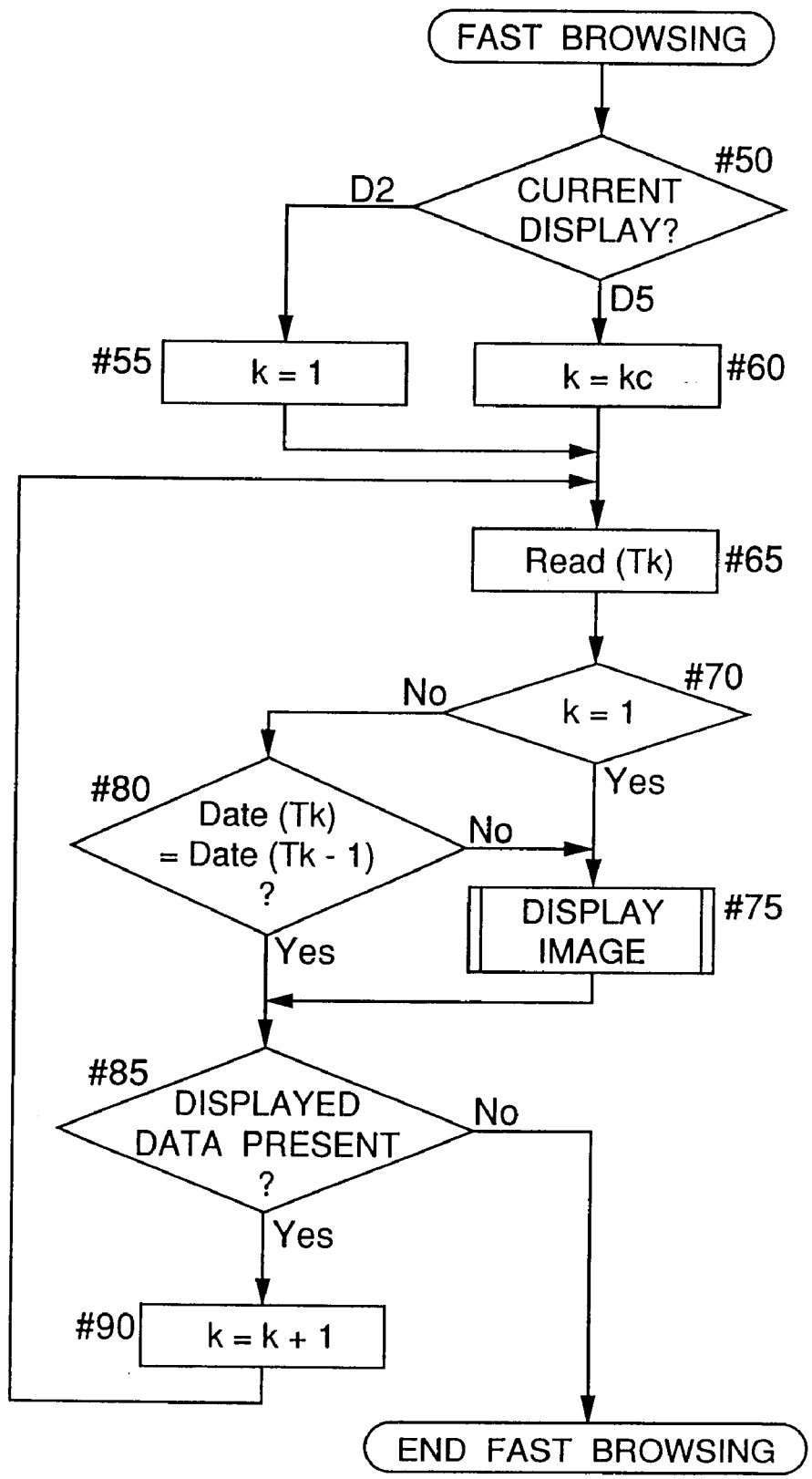
FIG. 13 is a flowchart showing an example of processing of a fast browsing mode in the sixth embodiment.

Subsequently, a processing flow of the fast browsing mode executed in the display D3 when the default fast browsing option (DISPLAY ONLY FIRST IMAGES OF IMAGES OF THE SAME PHOTOGRAPHING DATES) is selected will be described. FIG. 13 shows the processing flow. This flow starts in the display that precedes the display D3.

The display D2 or D5 precedes the display D3. At step #50, it is determined whether the (current) display in which the operation to establish the fast browsing mode is performed is the display D2 or the display D5. When the current display is the display D2, at step #55, a counter k for specifying the image file number of the image data to be read is set at 1. When the current display is the display D5, at step #60, the next number kc of the image file number of the displayed image data is set as k in the display D5. Then, at step #65, the tag Tk of the image file numbered k is read.

At step #70, whether k=1 or not is determined. When k=1, at step #75, the image data of the image file numbered 1 are displayed. When k≠1, at step #80, it is determined whether or not the photographing date Date(Tk) of the image data of the image file numbered k is the same as the photographing date Date(Tk−1) of the image data of the image file numbered k−1. When Date(Tk) and Date(Tk−1) are different, at step #75, the image data of the image file numbered k are displayed. When Date(Tk) and Date(Tk−1) are the same, the process proceeds to step #85 without performing image data reading or display. The process also proceeds to step #85 when image data display is performed at step #75.

At step #85, it is determined whether an image file numbered k+1 is present or not. When such an image file is absent, since there are no image data to be displayed, the fast browsing mode is ended. When such an image file is present, since image data to be displayed are present, the process proceeds to step #90, where k+1 is set as k. Then, steps #65 to #85 are repeated.

Subsequently, processing of the fast browsing mode executed when "DISPLAY ONLY IMAGES TAKEN WITH INTERVALS OF FIVE SECONDS OR LONGER" is selected will be described. Table 2 shows examples of image file numbers, photographing dates, photographing times, and whether the image files are displayed or not in this option. In this case, only images of image files numbered 156, 157, 160, 161 and 162 are displayed.

Figure 14:
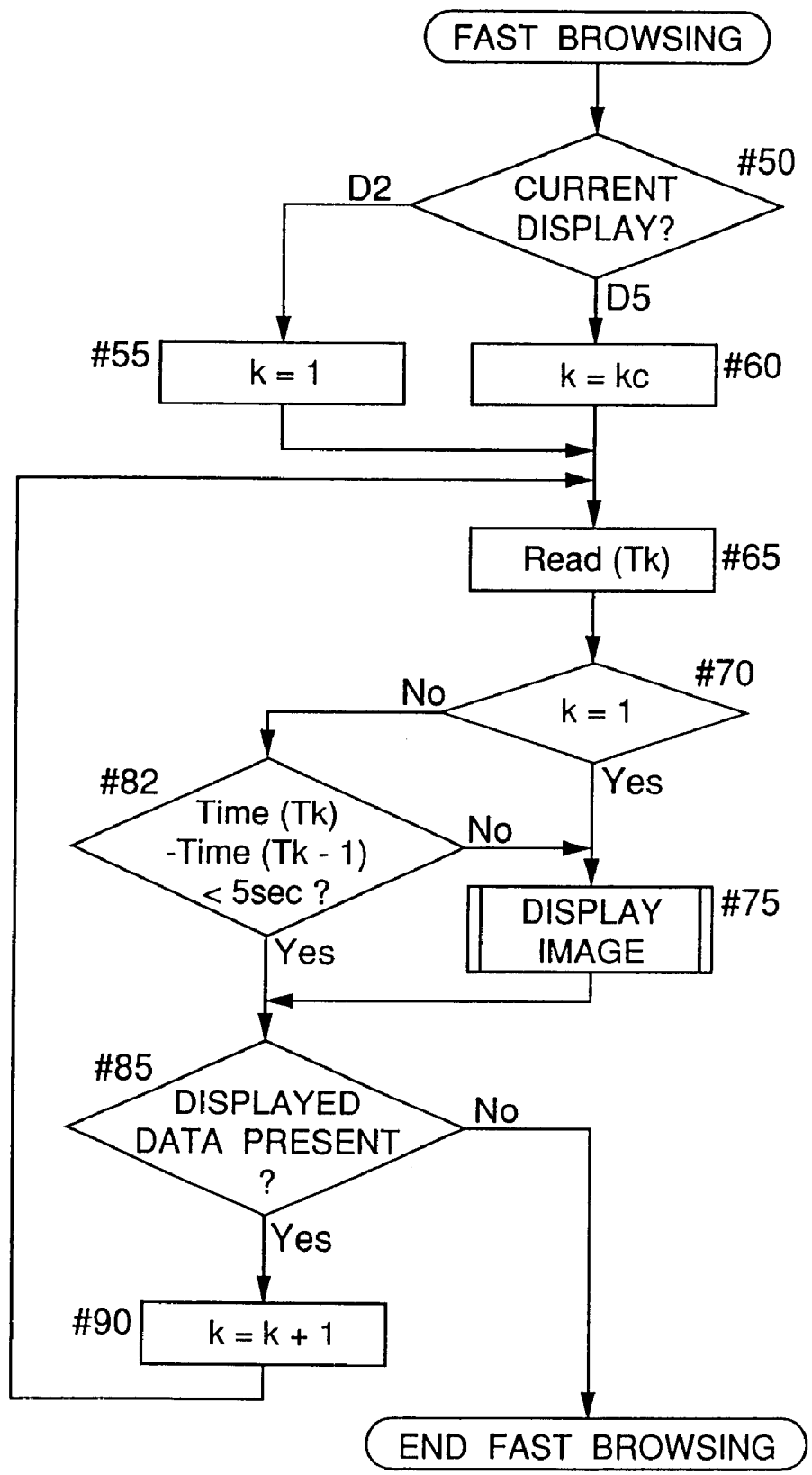
FIG. 14 is a flowchart showing another example of processing of the fast browsing mode in the sixth embodiment.

Control in this option will be described with reference to the processing flow shown in FIG. 14. This flow starts in the display preceding the display D3. In FIG. 14, steps where the same processings as those of the processing flow shown in FIG. 13 are denoted by the same step numbers. This flow is different from the flow of FIG. 13 only in that step #80 is replaced by step #82.

At step #82, it is determined whether or not the difference between the photographing time Time(Tk) of the image data of the image file numbered k and the photographing time Time(Tk−1) of the image data of the image file numbered k−1 is shorter than five seconds. When the difference is five seconds or longer, the process proceeds to step #75, where the image data of the image file numbered k are displayed. When the difference is shorter than five seconds, the process proceeds to step #85 without displaying the image file numbered k. The other steps will not be described since they are the same as those of FIG. 13. Five seconds in "DISPLAY ONLY IMAGES TAKEN WITH INTERVALS OF FIVE SECONDS OR LONGER" selected in the display D8 may be arbitrarily changed.

<Seventh Embodiment>

The image display apparatus of this embodiment is different from the image display apparatus of the sixth embodiment only in that a super-fast browsing mode is further provided. Therefore, only the different part will be described and no overlapping description will be given.

The outer rotary ring 781 of the rotary operation member 78 of this embodiment can also be rotated +90° to +110° and −90° to −110°. When the rotary operation member 78 is used to establish the browsing mode in the display D2 in the flowchart of FIG. 12, the flowchart of browsing mode establishment control shown in FIG. 15 is executed.

Figure 15:
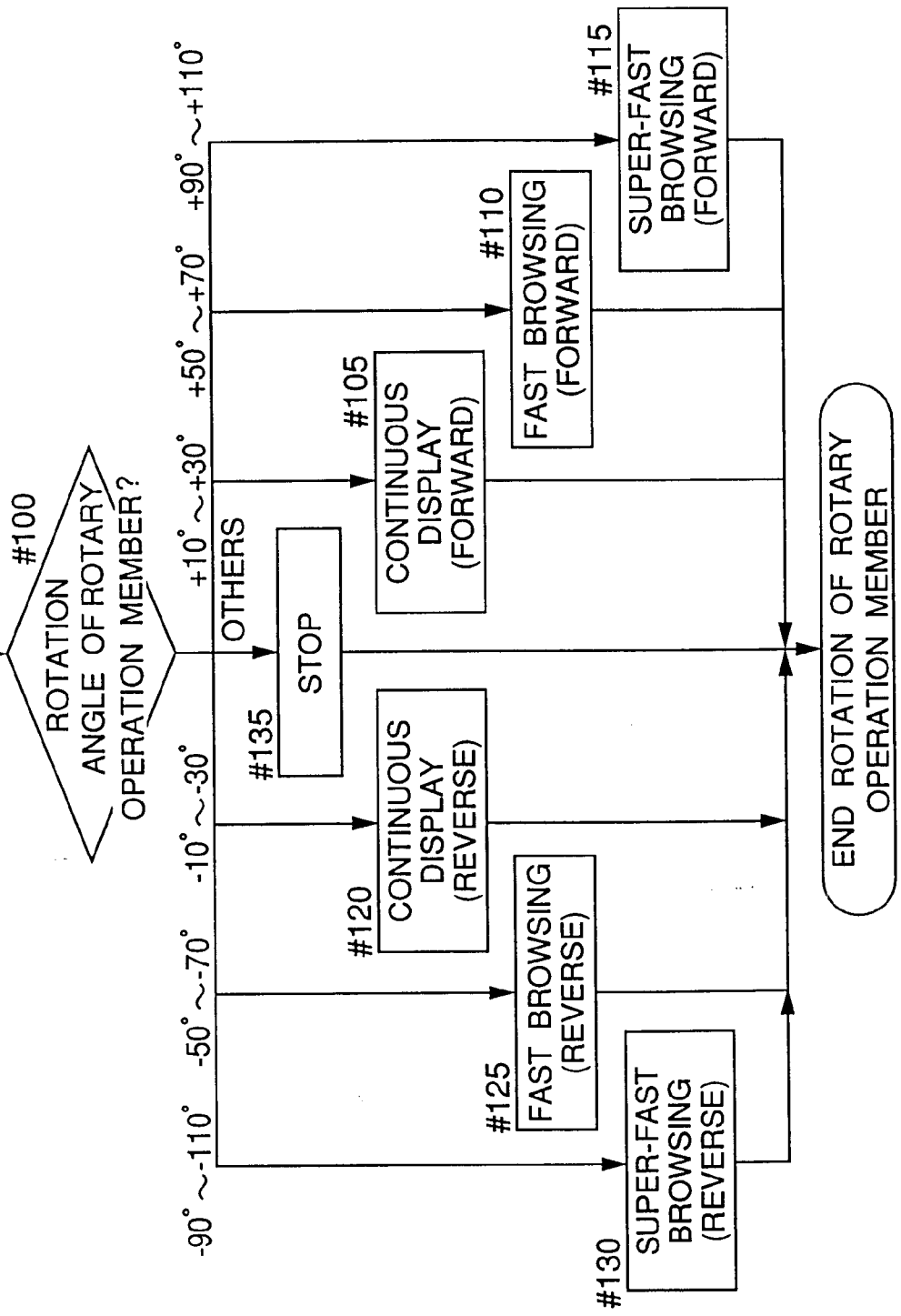
FIG. 15 is a flowchart of browsing mode establishment control in a seventh embodiment.

When the rotary operation member 78 is operated, at step #100 of FIG. 15, the angle of the outer rotary ring 781 is determined. When the rotation angle is +10° to +30°, the browsing mode is established, and at step #105, continuous display is performed (display equivalent to the image D4 of FIG. 12). When the rotation angle is +50° to +70°, the fast browsing mode is established, and at step #110, display is provided in accordance with the fast browsing option (display equivalent to the display D3 of FIG. 12). When the fast browsing option is the default, processing shown in the processing flow of FIG. 13 is performed.

When the rotation angle is +90° to +110°, a super-fast browsing mode is established, and at step #115, image display is performed. Step #115 is the same as step #110 in procedure but is different therefrom in that image display is performed after thumbnail image data are read out from an image file and interpolation is performed in accordance with the display screen of the display portion 6. In this case, since thumbnail image data are displayed, the time required for file reading can be largely reduced, so that browsing can be performed faster.

When the rotation angle falls within the ranges of −10° to −30°, −50° to −70° and −90° to −110°, the process proceeds to steps #120, #125 and #130, respectively. At steps #120, #125 and #130, reverse display of corresponding steps #105, #110 and #115 is performed. Specifically, for example, processing at step #125 performed when the browsing option is the default is similar to that of FIG. 13 except that the increment processing performed at step #90 of the processing flow of FIG. 13 is replaced by decrement processing. When the rotation angle does not fall within the range of −10° to −110° or +10° to +110°, the process proceeds to step #135 so that the displayed image is not changed.

<Eighth Embodiment>

The image display apparatus of this embodiment is different from the image display apparatus of the seventh embodiment only in a part of the display method. Therefore, only the different part will be described and no overlapping description will be given. While thumbnail images are displayed in the super-fast browsing mode in the seventh embodiment, some image file formats have no thumbnail image data corresponding to image data. In order that such file formats can be handled, in the eighth embodiment, the super-fast browsing mode is achieved by displaying one of the head portion, the central portion and the rear end portion of high-resolution image data of an image file. Alternatively, the super-fast browsing mode may be achieved by displaying image data being thinned out.

Display of the head portion, the central portion and the rear end portion of image data, and display of thinned-out images which were described in the second to fifth embodiments will not be described again. According to this display method, the amount of data to be read is smaller than when all the images are displayed, so that super-fast display is achieved.

<Ninth Embodiment>

The image display apparatus of this embodiment is different from the image display apparatus of the seventh embodiment only in a part of the display method. Therefore, only the different part will be described and no overlapping description will be given. In this embodiment, when "DISPLAY ONLY IMAGES TAKEN WITH INTERVALS OF FIVE SECONDS OR LONGER" is selected in the display D8 of FIG. 12, only images taken with intervals of five seconds or longer are displayed in the fast browsing mode, and only the first images of the images of the same photographing dates are displayed in the super-fast browsing mode. In this case, at step #110 of the processing flow of FIG. 15, the processing shown in FIG. 14 is performed, and at step #115, the processing shown in FIG. 13 is performed.

While the above-described seventh to ninth embodiments all have three kinds of browsing modes, namely, the browsing mode, the fast browsing mode and the super-fast browsing mode, the criterion for selection of displayed images in the fast browsing mode and in the super-fast browsing mode is not limited to the one described above. For example, a selection criterion may be provided such that the image data of the first image file of each month are displayed in the fast browsing mode and the image data of the first image file of each year are displayed in the super-fast browsing mode. Moreover, some selection criteria may be provided so that the user can make a selection from there-among.

<Tenth Embodiment>

The image display apparatus of this embodiment has a similar structure to that of the image display apparatus of the first embodiment and is different only in a part of the image data display processing method. Therefore, only the different part will be described and no overlapping description will be given.

In the magneto-optic disk 14, the image data of the image files are stored being compressed. When the image data are displayed, in the data processor 4, the compressed image data are read out from the magneto-optic disk 14 and decompressed, and then, the decompressed data are sent to the VRAM 5. In this embodiment, image data being read out once are held in subsequently described caches as space allows in a decompressed condition. Such control makes it unnecessary to again decompress the image data when the image data are displayed again, so that image data display can be performed fast. The image data display processing method will hereinafter be described.

The caches (retainer) used in this specification are memories assigned in the RAM 3 for storing image data being read out and decompressed. In this embodiment, a memory for storing six frames of image data is assigned as a cache.

Figure 16:
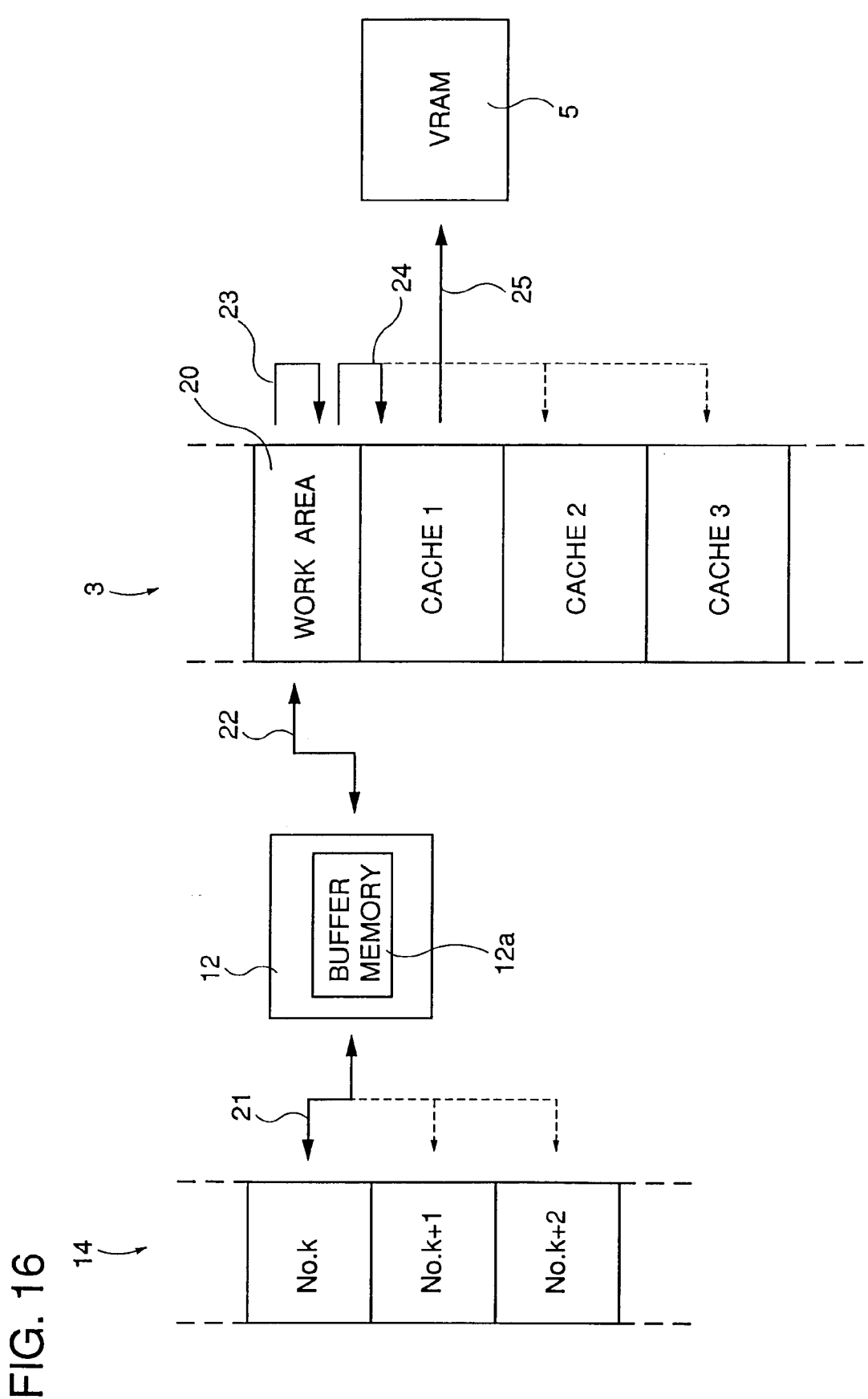
FIG. 16 is a system view showing image data flows in a tenth embodiment.
Figure 17:
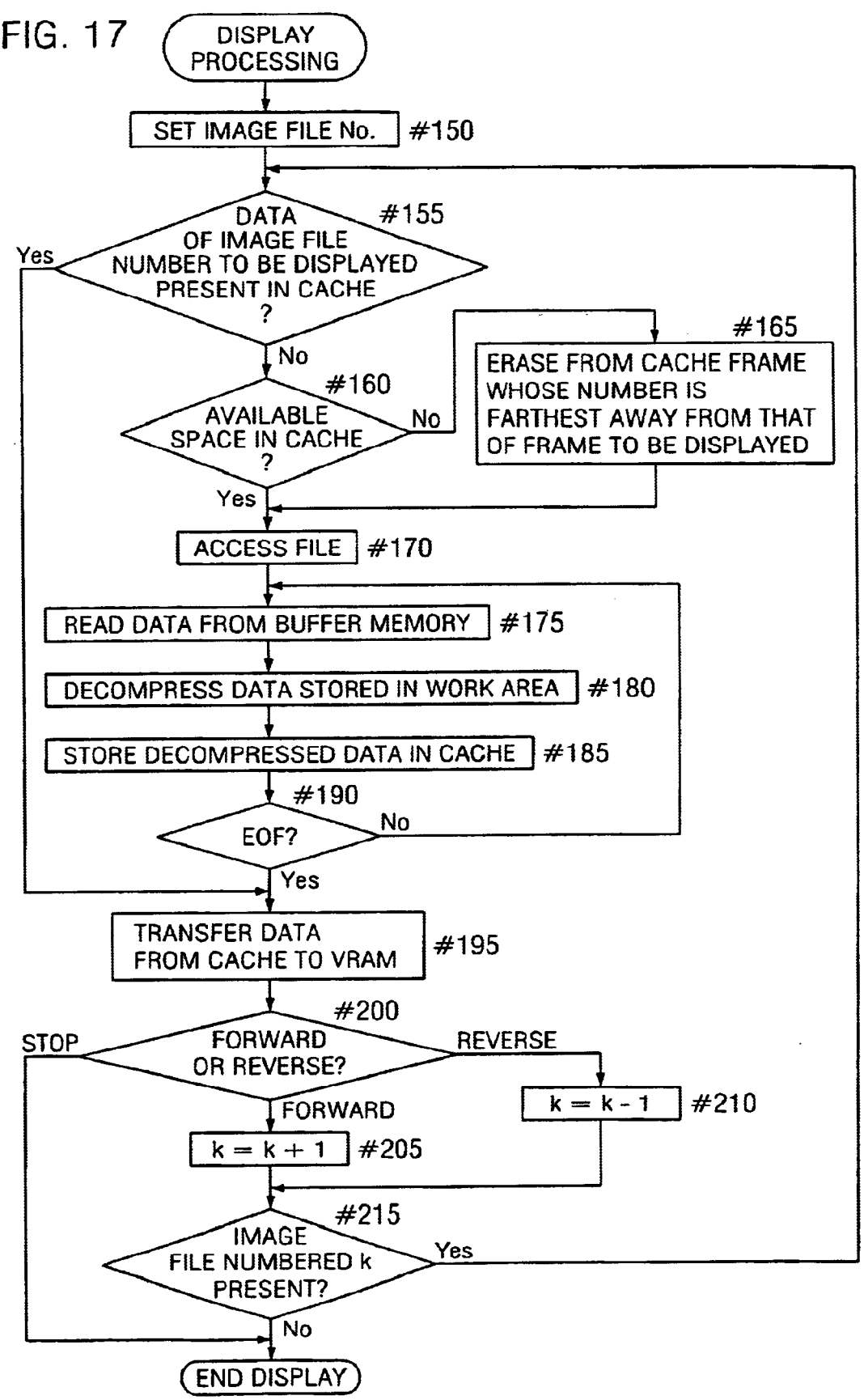
FIG. 17 is a flowchart showing image data display processing in the tenth embodiment.

FIG. 16 is a system view showing image data flows. FIG. 17 shows a control flow of the data processor 4 in the browsing mode and in the fast browsing mode. In each of a cache 1, a cache 2, a cache 3, . . . in FIG. 16, image data corresponding to one frame are stored. Reference numeral 20 represents a work area where image data are decompressed. The caches and the work area 20 are formed in the RAM 3. The arrows show the image data flows.

In FIG. 17, first, at step #150, the file number k of the image file to be displayed first is set. For example, when the image files are displayed from the first file, 1 is set as k. At step #155, it is determined whether the data of the image file number to be displayed is present in a cache or not. When the data is absent, at step #160, it is determined whether there is available space in the cache or not. When there is no available space in the cache, at step #165, the data of the image file number farthest away from the file number of the image file to be displayed are erased from the cache. Then, the process proceeds to step #170. When there is available space in the cache, the process directly proceeds to step #170.

At step #170, the image file of the file number to be displayed is accessed through the magneto-optic disk drive interface 12 (the arrow 21 of FIG. 16). At step #175, data in a buffer memory 12a in the magneto-optic disk interface 12 are read out (the arrow 22 of FIG. 16), and the data being read out are stored in the work area 20 in the RAM 3. Then, at step #180, the compressed image data are decompressed by use of another part of the work area 20 (the arrow 23 of FIG. 16).

At step #185, the decompressed image data are stored in an available cache (the arrow 24 of FIG. 16). At step #190, it is determined whether file reading has been completed or not. When file reading has not been completed, the process returns to step #175. When file reading has been completed, the process proceeds to step #195. When the image data of the image file number to be displayed are present in a cache at step #155, the process directly proceeds to step #195.

At step #195, from the cache in which the image data to be displayed are stored, the image data are transferred to the VRAM 5 (the arrow 25 of FIG. 16). When the image data are transferred to the VRAM 5, the image data are displayed on the display portion 6. At step #200, it is determined whether the current mode is forward display or reverse display. When the current mode is forward display, k+1 is set as k at step #205. When the current mode is reverse display, k−1 is set as k at step #210.

At step #215, it is determined whether the image file numbered newly-set k is present or not. When the image file is present, the process returns to step #155 to repeat processing similar to that described above. When the image data is absent, the processing in the browsing mode or in the fast browsing mode is ended. The processing is also ended when a stop operation is performed at step #200.

Between steps #195 and #200, when the following image data are present: the image data of an image file whose file number is a predetermined value away from that of the image file numbered k displayed at step #200 which image data are stored in a cache, it is desirable to erase the image data from the cache. Setting an appropriate value as the predetermined value reduces the probability that the image data of the image file the predetermined value away are displayed again. Therefore, the probability that such data are used is low even if they are held in the cache. By creating available space in the cache by erasing such data, the display processing proceeds more smoothly.

For example, when a value such that there is always available space in the cache is set as the predetermined value in view of the capacity of the cache, steps #160 and #165 are unnecessary, so that the display processing time is reduced.

<Eleventh Embodiment>

The image display apparatus of this embodiment is similar to that of the tenth embodiment except the part described below. In the image display apparatus of this embodiment, before the display processing of FIG. 17 is performed, subsequently-described image data storage processing is performed in which image data to be browsed are stored in a cache as long as there is available space in the cache. Therefore, in performing the image display processing of FIG. 17, at step #155, it is more frequently determined that image data are present in the cache.

Moreover, this embodiment is different from the tenth embodiment in that data for thumbnail display are used as the image data displayed in the browsing mode. The fast browsing mode is not provided. The outer rotary ring 781 of the rotary operation member 78 has functions equivalent to those of the keys shown below according to the rotation angle. The functions in this embodiment are different from those of the first embodiment.

+10° to +70°: the forward key 75
−10° to −70°: the reverse key 73
The other angles: the stop key 74

The manner of display transition is that of FIG. 7 from which the display D3 is excluded. The operations to shift the display are similar to those shown in FIG. 7.

Figure 18:
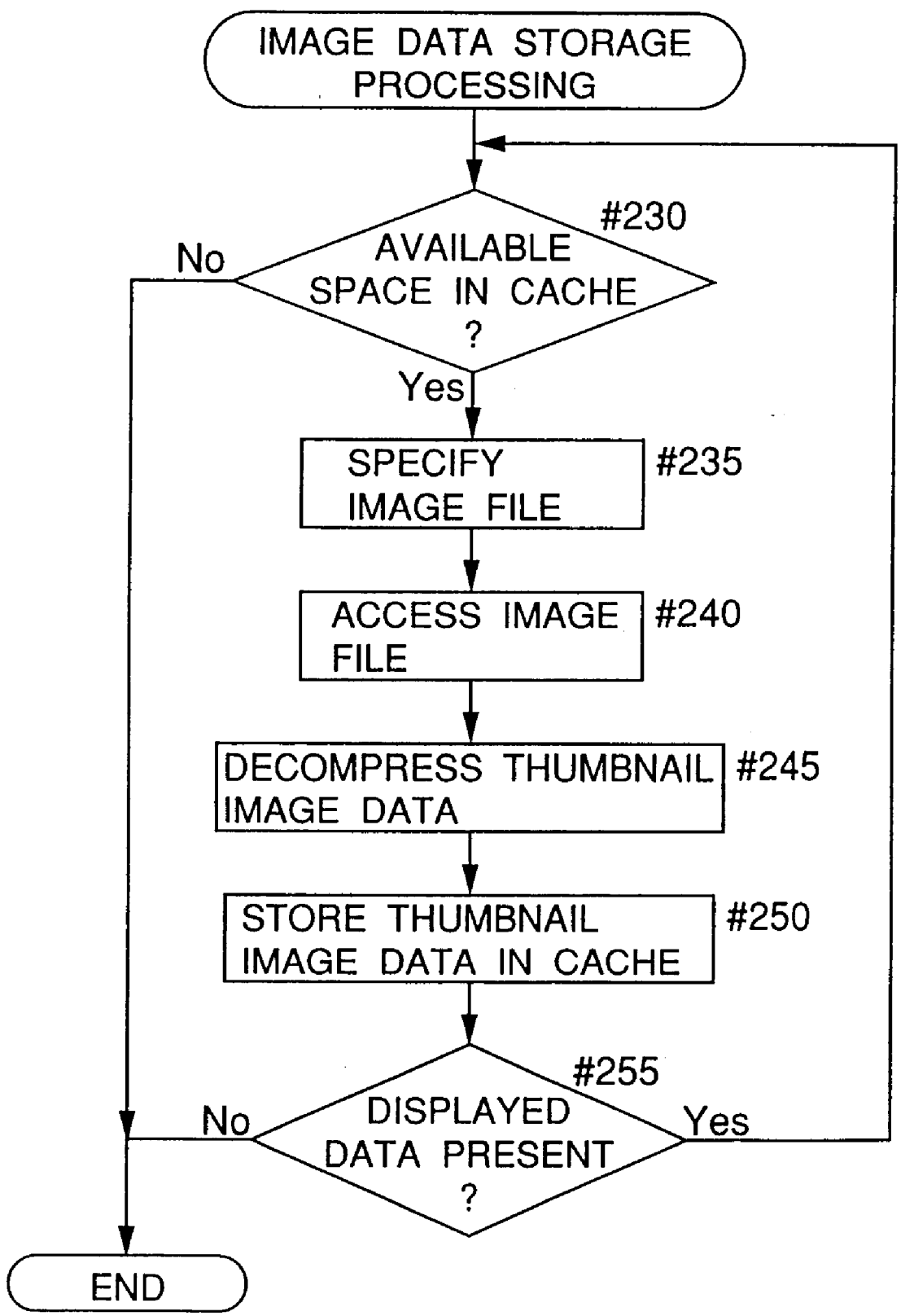
FIG. 18 is a flowchart showing image data storage processing in an eleventh embodiment.

Subsequently, the image data storage processing will be described. FIG. 18 is a control flow of the image data storage processing of the data processor 4. At step #230, it is determined whether there is available space in a cache or not. When there is no available space in the cache, this processing is ended. When there is available space in the cache, the process proceeds to step #235, where an image file number is specified (the image file numbered 1 is specified first).

Then, at step #240, the image file of the specified number is accessed, and image data for thumbnail display are read in. At step #245, the image data for thumbnail display are decompressed in the work area 20. At step #250, the decompressed image data are stored in the cache. In the EXIF format, since image data for thumbnail display are not compressed, step #245 is unnecessary.

At step #255, it is determined whether an image file not stored in a cache is present or not. When such an image files is present, the process returns to step #230 to repeat processing similar to the one described above. Thus, the processing to store image data for thumbnail display in a cache as long as there is available space in the cache is repeated for all the image files. After the image data storage processing is finished, the display processing shown in FIG. 17 is performed.

Control in this embodiment is effective when the total amount of image data is small. Particularly, when all the image data can be stored in a cache, the time required for image reading is reduced when image display is performed as well as when image data are displayed again in the browsing mode. That is, browsing can be performed in a short time.

Obviously, many modifications and variations of the present invention are possible in light of the above teachings. It is therefore to be understood that within the scope of the appended claims, the invention may be practiced other than as specifically described.

TABLE 1

| Image file No. | Photographing date | Photographing time | Displayed: 1 Not displayed: 0 |
|---|---|---|---|
| . . . | . . . | . . . | . . . |
| No. 156 | 1997.10.1 | 10:10:53 | 1 |
| No. 157 | 1997.10.1 | 14:21:10 | 0 |
| No. 158 | 1997.10.1 | 14:21:12 | 0 |
| No. 159 | 1997.10.1 | 14:21:13 | 0 |
| No. 160 | 1997.10.15 | 20:20:00 | 1 |
| No. 161 | 1997.10.16 | 17:50:05 | 1 |
| No. 162 | 1997.10.16 | 19:46:38 | 0 |
| . . . | . . . | . . . | . . . |

TABLE 2

| Image file No. | Photographing date | Photographing time | Displayed: 1 Not displayed: 0 |
|---|---|---|---|
| . . . | . . . | . . . | . . . |
| No. 156 | 1997.10.1 | 10:10:53 | 1 |
| No. 157 | 1997.10.1 | 14:21:10 | 1 |
| No. 158 | 1997.10.1 | 14:21:12 | 0 |
| No. 159 | 1997.10.1 | 14:21:13 | 0 |
| No. 160 | 1997.10.15 | 20:20:00 | 1 |
| No. 161 | 1997.10.16 | 17:50:05 | 1 |
| No. 162 | 1997.10.16 | 19:46:38 | 1 |
| . . . | . . . | . . . | . . . |

What is claimed is:

1. An image display apparatus comprising:

a display for displaying image data; and a controller having a first display mode for successively displaying on said display low-resolution image data of each of a plurality of image files from an image recording medium on which said plurality of image files is recorded, each image file containing low-resolution image data and high-resolution image data, and said controller has a second display mode for successively displaying on said display the high-resolution image data of each of the image files, wherein the successively displaying in the first display mode and the successively displaying in the second display mode can each be performed in a forward and rearward manner.

2. An image display apparatus as claimed in claim 1, further comprising:

a rotary operation member which can be rotated to select one of the first and second display modes of said controller.

3. An image display apparatus as claimed in claim 1, wherein, in the first display mode, said controller operates such that the low-resolution image data are displayed with enlargement.

4. A method for displaying image data from an image recording medium on which a plurality of image files is recorded, each image file containing low-resolution image data and high-resolution image data, said method comprising:

a step of selecting to display the low-resolution image data or the high resolution image data as selected image data;

a step of successively displaying the selected image data of each of the image files, wherein the step of successively displaying the selected image data of each of the image files can be performed in a forward and rearward manner for the low-resolution image data and for the high resolution image data.

5. An image display apparatus comprising:

a display for displaying image data; and a controller having a first display mode for successively displaying on said display only a predetermined area of image data, corresponding to only a part of an image, of each of a plurality of image files from an image recording medium on which said plurality of image files is recorded, each image file containing image data, and said controller has a second display mode for successively displaying on said display the entire image data of each of the image files, wherein the successively displaying in the first display mode and the successively displaying in the second display mode can each be performed in a forward and rearward manner.

6. An image display apparatus as claimed in claim 5, wherein the predetermined area is a head portion of the image data of a respective image file.

7. An image display apparatus as claimed in claim 5, wherein the predetermined area is a middle portion of the image data of a respective image file.

8. An image display apparatus as claimed in claim 5, wherein the predetermined area is a tail portion of the image data of a respective image file.

9. A method for displaying image data from an image recording medium on which a plurality of image files is recorded, each image file containing image data, said method comprising:

a step of selecting to display partial image data or entire image data as selected image data;

a step of successively displaying the selected image data of each of the image files, wherein the step of successively displaying the selected image data of each of the image files can be performed in a forward and rearward manner for the partial image data and for the entire image data.

10. An image display apparatus comprising:

a display for displaying image data; and a controller having a first display mode for successively displaying on said display image data of each image file selected according to tag information, which specifies a selection criterion for determining whether or not image data is displayed, from a plurality of image files on an image recording medium on which said plurality of image files is recorded, each image file containing image data and tag information, wherein the successively displaying in the first display mode can be performed in a forward and rearward manner.

11. An image display apparatus as claimed in claim 10, wherein said controller further has a second display mode for displaying on said display image data of each of the image files in chronological order.

12. An image display apparatus as claimed in claim 11, further comprising:

a rotary operation member which can be rotated through a first rotation angle or a second rotation angle to select the first display mode or the second display mode, respectively, of said controller, said first rotation angle being greater than said second rotation angle.

13. An image display apparatus as claimed in claim 10, wherein said controller further has a second display mode for displaying successively on said display image data of each image file selected according to tag information from the plurality of image files, where the image files selected are less than the image files selected in the first display mode.

14. An image display apparatus as claimed in claim 13, wherein the image data contained in the image files are image data recorded by a digital camera, wherein the tag information includes data representing at least one of a date and a time when respective image data were recorded, and wherein a criterion used by said controller to select the particular ones of the image files in the first and second display modes is selectable from among a plurality of choices.

15. An image display apparatus as claimed in claim 10, wherein the image data contained in the image files are image data recorded by a digital camera, wherein the tag information includes data representing at least one of a date and a time when respective image data were recorded, and wherein, in the first display mode, said controller can select image files that were recorded earliest for each image recording date.

16. An image display apparatus as claimed in claim 10, wherein the image data contained in the image files are image data recorded by a digital camera, wherein the tag information includes data representing at least one of a date and a time when respective image data were recorded, and wherein, in the first display mode, said controller can select image files that were recorded a length of time greater than a predetermined length of time since image data were previously recorded.

17. A method for displaying image data from an image recording medium on which a plurality of image files are recorded, each image file containing image data and tag information, said method comprising:

a step of selecting particular ones of the image files according to tag information, the tag information specifying a selection criterion for determining whether or not image data is displayed; and a step of successively displaying the image data of each of the selected image files, wherein the step of successively displaying the selected image data according to tag information can be performed in a forward and rearward manner.

18. An image display apparatus comprising:

a display for displaying image data;

a retainer for retaining the image data; and a controller that operates such that image data of a number n of image files recorded in compressed form on an image recording medium are expanded so as to be retained in said retainer, and that the image data retained in said retainer are then displayed successively on said display;

wherein, on said image recording medium, the image data of each of said number n of image files are respectively assigned one of image numbers in chronological order, wherein said controller has a forward display mode in which the image number of the image data displayed on said display is increased by increments of one and a backward display mode in which the image number of the image data displayed on said display is decreased by decrements of one, and wherein it is possible to switch between the forward and backward display modes.

19. An image display apparatus as claimed in claim 18, wherein said controller erases the image data retained in said retainer that has an image number greater than a predetermined value apart from the image number of the image data that are currently being displayed on said display.

20. A method for displaying image data from an image recording medium on which image data of a number n of image files are recorded in compressed form, comprising the steps of:

receiving the image data from said image recording medium;

assigning one of image numbers in chronological order to the image data of each of said number n of image files;

decompressing the thus received image data;

retaining the thus decompressed image data in a retainer;

selecting between a forward display mode, in which the image number of the image data displayed on said display is increased by increments of one, or in a backward display mode, in which the image number of the image data displayed on said display is decreased by decrements of one; and successively displaying the image data retained in said retainer in the selected one of the forward display mode and the backward display mode.

* * * * *